J. A. SHEPARD.
BRAKE FOR HOISTING APPARATUS.
APPLICATION FILED MAY 5, 1909.

990,914.

Patented May 2, 1911.

2 SHEETS—SHEET 1.

WITNESSES:
M. E. Verbeck.
A. W. Foster

INVENTOR
James A. Shepard
BY
Eugene Diven
ATTORNEY

J. A. SHEPARD.
BRAKE FOR HOISTING APPARATUS.
APPLICATION FILED MAY 5, 1909.

990,914.

Patented May 2, 1911.

2 SHEETS—SHEET 2.

WITNESSES:
M. E. Verbeek.
A. W. Foster

INVENTOR
James A. Shepard
BY
Eugene Diven
ATTORNEY

UNITED STATES PATENT OFFICE.

JAMES A. SHEPARD, OF MONTOUR FALLS, NEW YORK.

BRAKE FOR HOISTING APPARATUS.

990,914.  Specification of Letters Patent.  Patented May 2, 1911.

Application filed May 5, 1909. Serial No. 494,156.

*To all whom it may concern:*

Be it known that I, JAMES A. SHEPARD, a citizen of the United States, residing at Montour Falls, in the county of Schuyler and State of New York, have invented certain new and useful Improvements in Brakes for Hoisting Apparatus, of which the following is a specification.

This invention relates to automatically operated brakes for cranes, hoists, and the like, by which to control the descent of the load; and the object of my invention is to provide a mechanism of this character which will effectively hold the load in suspension except when the driving motor rotates in the lowering direction, and which during the descent of the load will prevent any tendency for the speed of the motor to be accelerated by the load.

To accomplish my object advantage is taken of the fact that the stationary gear of a planetary train of gearing, or the support of an idle gear of an ordinary train of gearing, while normally stationary when the train of gearing is in operation, may, if given some latitude for motion, respond by a slight corresponding movement to every change in the intensity or direction of force transmitted by the gear train. Hence, if the above mentioned stationary gear or support for an idler gear is connected in appropriate manner to a brake acting through the medium of a ratchet upon one of the revoluble members of the gear train, an application of the brake will be effected automatically, which, responding in its intensity to all the variations in resistance of the load being moved, assumes a braking effect always in perfect balance with the effort of the load to run down. If the braking effort is so proportioned as to be slightly in excess of the effort of the load to run down, the load will, therefore, remain suspended in any position at which the hoisting effort transmitted through the gearing ceases. A slight application of power through the gear train in a lowering direction causes a reversal in direction of the forces which set the brake, and the brake tension is decreased until the brake slips and the load descends.

For a better understanding of my invention reference may be had to the accompanying drawings, in which I have illustrated two methods by which it may be made operative; and in which—

Figure 1:
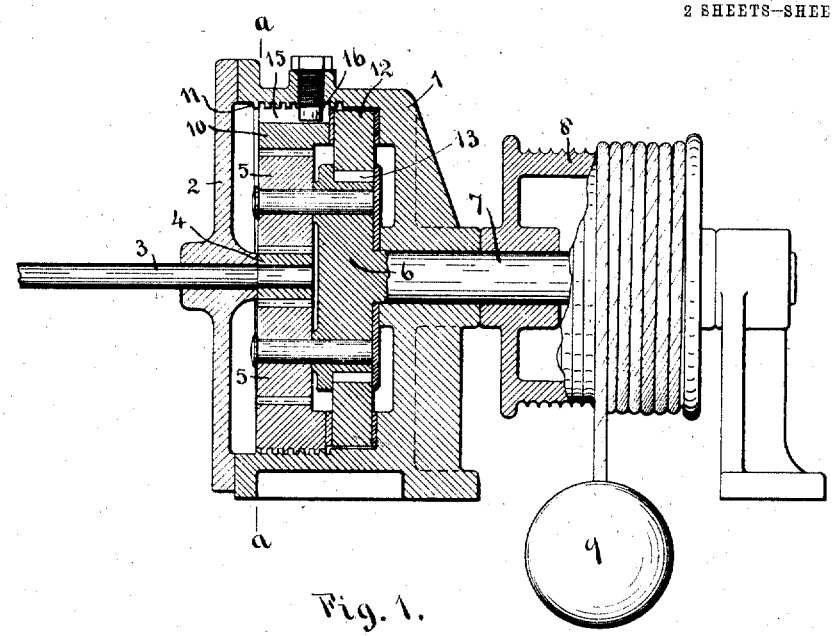
Figure 2:
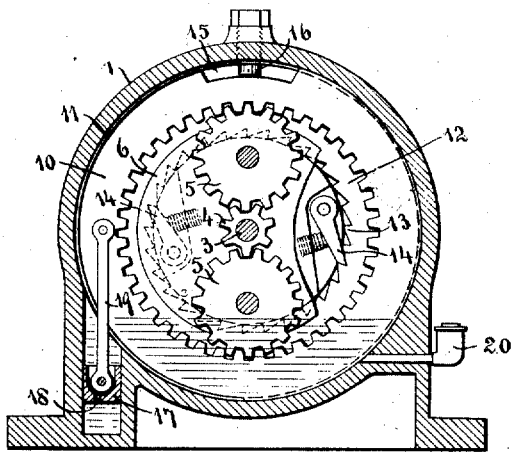
Figure 3:
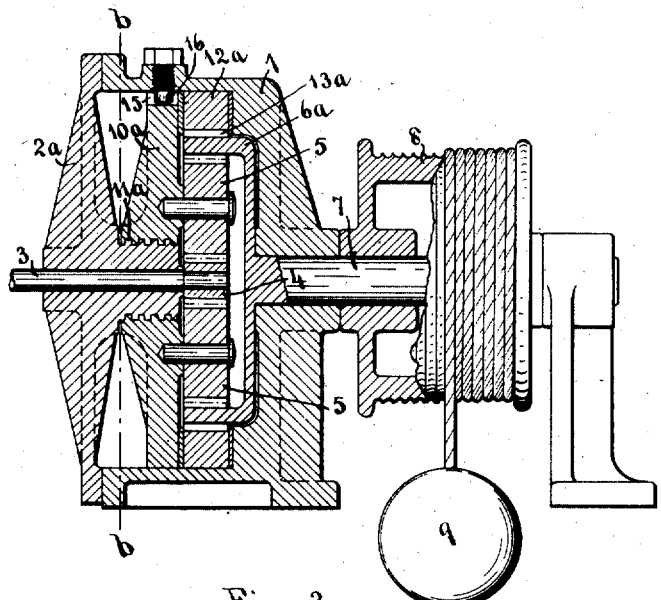

Figure 1 represents a vertical longitudinal section through a hoisting apparatus showing a winding drum and suspended load driven by a train of planetary gears equipped with my brake mechanism; Fig. 2, a transverse section of the same on line *a—a* in Fig. 1; Fig. 3, a vertical longitudinal section of a modified form of the apparatus, showing the winding drum and suspended load driven by an ordinary train of gears; and Fig. 4, a transverse section on the line *b—b* in Fig. 3.

Referring first to Figs. 1 and 2, the gear train is shown housed in a case 1, closed at one end by an integral head, and at the other by a removable head 2, in which latter head there is mounted a driving shaft 3, which will be driven by an electric motor, or other suitable motive power. Upon the inside of head 2, shaft 3 is provided with a driving pinion 4, which meshes with the planetary gears 5, mounted on a revoluble disk 6, attached to the drum shaft 7, upon which the drum 8 is shown partly in elevation, with a weight 9 suspended from a cable wound thereon.

The gears 5 are in mesh with internal gear teeth formed on the normally stationary ring 10. This gear ring is provided with screw threads around its outer periphery, which engage threads 11 on the case 1. The inward face of the ring 10 is adapted to engage the brake ring 12, which is loosely mounted within the case around the disk 6 and is adapted to be set up against a brake surface provided therefor on the head of the case, friction rings of suitable material being inserted at each side of the brake ring. On its inner periphery the brake ring is provided with ratchet teeth 13, which are engaged by one or more pawls 14, mounted in the disk 6, as shown in Fig. 2.

For limiting the rotative motion of the gear ring 10, I provide the ring with a recess at 15, into which projects a pin 16, inserted by a screw joint through the top of the case.

At one side of the case is a cylindrical oil chamber forming a dashpot, in which is mounted the piston 17, provided with a small passageway 18, and coupled to the ring 10 by means of the connecting rod 19. Oil is introduced into the bottom of the case to the level indicated in Fig. 2 through the charging cup 20.

The operation of the apparatus is as follows:—When the shaft 3 is rotated in a direction to lift the load of the gears 5, owing to the resistance of the load, will first act to turn the ring 10, causing it to rotate screw-wise on the threads 11, and pressing it against the brake ring 12; the gear ring and the brake ring being thus locked together in immovable position. The gears 5 will then travel around the gear ring 10, imparting motion to the disk 6, and to the drum shaft to raise the load; the pawls and ratchet teeth 14 and 13 permitting the free movement, in this direction, of the disk and drum shaft. When the driving effort through shaft 3 is discontinued the reversal of the direction of rotation of the drum to lower the load is prevented by the pawls on the disk 6 engaging the ratchet teeth on the fixed brake ring. If the shaft 3 be now rotated in a direction to lower the load, the gears 5 will act upon the gear ring 10 to turn it in the reverse direction, thereby causing it to move outward on the screw threads, releasing the brake ring 12, and permitting it to slip and turn with the disk 6 in the lowering direction. Should the velocity of rotation of the winding drum, and consequently that of the disk 6, exceed a speed corresponding to that of the shaft 3, such excess of speed in the disk 6 will act through the gears 5 to turn the gear ring 10, and again set it up against the brake ring 12, thereby retarding the motion of the brake ring, and consequently the motion of the disk 6 through the pawl and ratchet connection; thus either retarding the lowering speed or bringing the winding drum to rest, according to the intensity of the reaction set up in the gear ring 10.

I have found in practice that, to prevent disturbance of the action of the brake by the inertia and momentum of the parts which apply the brake pressure, it is necessary to provide a dashpot or its equivalent to avoid sudden variations in the brake tension and consequent chattering. Thus each variation in the position of the gear ring 10 is accompanied by a corresponding movement of the connecting rod 19 and piston 17, which, by means of the vent 18, permits the movement at a rate of speed controllable by the capacity of the vent; thus powerfully resisting any tendency to rapid changes of position which might develop into a chatter.

I have also found, since the efficiency and durability of both the gearing and brake surfaces are improved by being partly submerged in lubricant, that it is desirable to place both the brake and gearing in the common inclosing case 1, allowing them to run in a common bath of lubricant. This is especially true since the heat generated by the brake is absorbed by the lubricant, which by circulation distributes the heat, so that it will be radiated from the large area of the common inclosing case. I therefore provide the oil filler 20, by which the level of the oil in the bottom of the case may be maintained at a sufficient depth to effect this lubrication of the several parts, as shown in Fig. 2.

In order that the longitudinal movement of the gear ring 10 may never exceed the maximum required for regulating the pressure delivered to the brake ring, and also to provide a positive resistance to the reaction of the gear ring when the brake is released, I provide the stop pin 16, and the recess 15, which latter is made of the necessary width to permit sufficient movement of the gear ring to release or effectually grip the brake ring.

Figure 4:
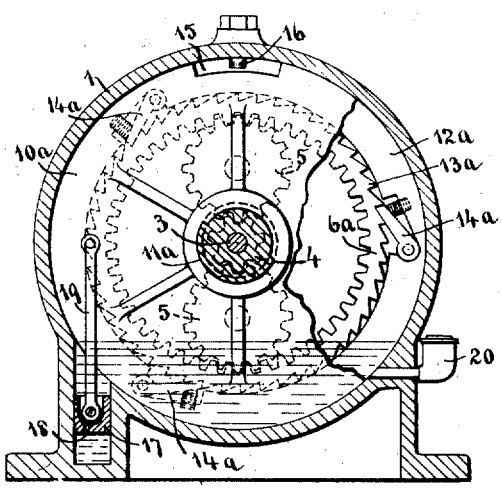

In the modification shown in Figs. 3 and 4, the intermediate gears 5 are mounted upon a normally stationary disk $10^a$, said disk having screw threaded engagement at $11^a$ with an inward hublike projection on the head $2^a$ of the case. The gears 5 are thus idle gears, and they mesh with the internal gear on the ring $6^a$ mounted on the drum shaft 7. This gear ring $6^a$ is provided on its outer periphery with ratchet teeth $13^a$, and the brake ring $12^a$ is provided with one or more pawls $14^a$ to engage these ratchet teeth. In this construction the connecting rod 19 is coupled to the disk $10^a$.

In operation, when the shaft 3 is rotated in the direction to lift the load, the resistance of the load will first hold the gear ring $6^a$ stationary, thereby causing the gears 5 to produce a partial rotation of the disk $10^a$, thereby setting up the disk against the brake ring $12^a$, and rendering both the disk and the brake ring stationary. Continued rotation of the shaft 3 will then, through the idlers 5, cause rotation of the gear ring $6^a$, and of the winding drum; the ratchet and pawls $13^a$ and $14^a$ permitting freedom of motion in this direction. When the shaft 3 is brought to rest, the brake ring $12^a$ will hold the load suspended through the co-action of the pawl and ratchet gear; and, when the shaft is reversed to lower the load, the disk $10^a$ will first be eased off to release the brake ring and the subsequent action of the load, in lowering, will be the same as heretofore described in connection with the planetary gear train mechanism.

It will be noted that, in either form, the gears 5, which mate with the driving gear 4, impart the motion to the normally stationary member, whereby the effort transmitted by the gear train is caused to react upon the braking surface, which, in these illustrations, is provided on the head of the gear case; the normally stationary member being, in the one case, the gear ring 10 and, in the other case, the disk $10^a$ upon which the mating gears 5 are mounted.

While I have thus shown my invention as applied to two different forms of gear trains, I do not in any sense limit myself in this respect, as many methods of application may be devised without departing from the spirit of my invention.

What I claim and desire to secure by Letters Patent is—

1. A gear train having a normally stationary member, means for permitting a partial rotation of said member to a positively limited extent, and a brake adapted to be actuated by the movement of said member.

2. A gear train having a normally stationary member, means for permitting a partial rotation of said member to a positively limited extent, means whereby such partial rotation will effect longitudinal motion in said member, and a brake adapted to be actuated by the longitudinal motion of said member.

3. A gear train having a normally stationary member, means for permitting a partial rotation of said member to a positively limited extent, a brake adapted to be actuated by the movement of said member, and connecting means between the brake and a member of the gear train whereby the brake will offer no material resistance to rotation of the gear train in one direction and will cause resistance to rotation in the opposite direction.

4. A gear train having a normally stationary member, means for permitting a partial rotation of said member to a positively limited extent, a revoluble brake ring, means whereby the partial rotation of said member will effect longitudinal motion in the member to move it against the brake ring and set the ring against a braking surface, and connecting means between the brake ring and a driven member of the gear train whereby the ring will offer no material resistance to rotation of the gear train in one direction and will cause resistance to rotation in the opposite direction.

5. A gear train having a normally stationary member, means for permitting a partial rotation of said member, a brake adapted to be actuated by the partial rotation of said member, and means for controlling the velocity of movement of said member.

6. A gear train having a normally stationary member, means for permitting a partial rotation of said member, a brake adapted to be actuated by the partial rotation of said member, a dashpot, and a connection between said member and the dashpot.

7. A gear train having a normally stationary member, means for permitting a partial rotation of said member, a brake adapted to be actuated by the partial rotation of said member, and a case for the gear train and brake containing a bath of fluid lubricant in which the gear train and brake are partially immersed.

8. A gear train having a normally stationary member, means for permitting a partial rotation of said member, a case within which the gear train is mounted, said case being provided with a braking surface, and means whereby the effort transmitted by the gear train will be caused to react through said member upon the braking surface.

9. A gear train, a brake, a case within which the gear train and brake are mounted, said case being provided with a braking surface, means automatically acted upon by the effort transmitted by said gear train to set and release the brake, and a bath of fluid lubricant contained in the case in which the gear train, brake and braking surface are partially immersed.

10. A gear train comprising a driving gear, a mating gear, a member susceptible of partial rotation by the mating gear in either direction about the axis of the driving gear, a brake, and means actuated by the partial rotation of said member in one direction or the other to set or release the brake.

11. A gear train comprising a driving gear, a mating gear, a member susceptible of partial rotation by the mating gear in either direction about the axis of the driving gear, a brake, means actuated by the partial rotation of said member in one direction or the other to set or release the brake, and means for controlling the velocity of movement of said member.

12. A gear train comprising a driving gear, a mating gear, a member susceptible of partial rotation by the mating gear about the axis of the driving gear and of longitudinal movement along said axis, means whereby the partial rotation of said member will effect its longitudinal movement, and a brake actuated by the longitudinal movements of said member.

13. A gear train comprising a driving gear, a mating gear, a member susceptible of partial rotation by the mating gear about the axis of the driving gear and of longitudinal movement along said axis, means whereby the partial rotation of said member will effect its longitudinal movement, a brake ring adapted to be set up against a braking surface by the longitudinal movement of said member, a driven member concentric with the brake ring, and a pawl and ratchet gear between the brake ring and the driven member.

14. A gear train comprising a driving gear, a mating gear, a member susceptible of partial rotation by the mating gear in either direction about the axis of the driving gear, a case within which the gear train is mounted, said case being provided with a braking surface, means whereby the effort transmitted by the gear train is caused to react through said member upon the braking surface, and a bath of fluid lubricant in the case in which the gear train and braking surface are partially immersed.

15. A planetary gear train in which the normally stationary member is rendered susceptible of partial rotation, and means whereby the effort transmitted by the gear train is caused to react through said member upon a braking surface.

16. A planetary gear train in which the normally stationary member is rendered susceptible of partial rotation, and a brake adapted to be actuated by the movement of said member.

17. A gear train having a revolubly mounted but normally stationary member, means whereby partial rotation of said member to a positively limited extent in either direction will be effected through the effort transmitted by the gear train, and means whereby the effort so transmitted is caused to react through said member upon a braking surface.

18. A gear train having a normally stationary member, means whereby motion to a positively limited extent will be imparted to said member by the effort transmitted by the gear train, and means whereby the effort so transmitted is caused to react through said member upon a braking surface.

19. A gear train having a normally stationary member, means whereby motion to a positively limited extent will be imparted to said member by the effort transmitted by the gear train, a brake adapted to be actuated by the movement of said member, and connecting means between the brake and gear train whereby the brake will offer no resistance to rotation in one direction and will cause resistance to rotation in the opposite direction.

20. A gear train having a normally stationary member, means whereby motion to a limited extent will be imparted to said member by the effort transmitted by the gear train, means for controlling the speed of such motion, and means whereby the effort so transmitted is caused to react upon a braking surface.

In testimony whereof I have affixed my signature, in presence of two witnesses.

JAMES A. SHEPARD.

Witnesses:
M. E. VERBECK,
EUGENE DIVEN.